United States Patent
Yamagajo et al.

(10) Patent No.: US 7,633,445 B2
(45) Date of Patent: Dec. 15, 2009

(54) RADIO FREQUENCY IDENTIFICATION TAG AND ANTENNA FOR RADIO FREQUENCY IDENTIFICATION TAG

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 75 days.

(21) Appl. No.: 11/527,331

(22) Filed: Sep. 27, 2006

(65) Prior Publication Data
US 2007/0273527 A1 Nov. 29, 2007

(30) Foreign Application Priority Data
May 24, 2006 (JP) ............................. 2006-144291

(51) Int. Cl.
*H01Q 1/38* (2006.01)
*G08B 13/14* (2006.01)

(52) U.S. Cl. .............................. 343/700 MS; 340/572.7

(58) Field of Classification Search .......... 343/700 MS, 343/853; 340/575.7, 572.7
See application file for complete search history.

(56) References Cited

U.S. PATENT DOCUMENTS

| | | | |
|---|---|---|---|
| 6,147,606 A | 11/2000 | Duan | |
| 6,215,402 B1 * | 4/2001 | Kodukula et al. | 340/572.8 |
| 6,320,509 B1 | 11/2001 | Brady et al. | |
| 6,606,061 B2 | 8/2003 | Wong et al. | |
| 7,158,037 B2 * | 1/2007 | Forster et al. | 340/572.8 |
| 7,262,701 B1 * | 8/2007 | Nguyen | 340/572.7 |
| 7,336,243 B2 * | 2/2008 | Jo et al. | 343/895 |
| 2003/0063031 A1 * | 4/2003 | Wong et al. | 343/700 MS |
| 2005/0206524 A1 | 9/2005 | Forster et al. | |
| 2005/0275539 A1 | 12/2005 | Sakama et al. | |
| 2006/0055542 A1 * | 3/2006 | Forster et al. | 340/572.7 |

FOREIGN PATENT DOCUMENTS

| | | |
|---|---|---|
| DE | 19703864 | 6/1998 |
| EP | 1542312 | 6/2005 |
| EP | 1780829 | 5/2007 |
| EP | 1 826 866 A1 | 8/2007 |
| JP | 2006-25390 A | 1/2006 |

(Continued)

OTHER PUBLICATIONS

"Communication of 10 m with tags attachable to metal in UHF (950 MHz) band is achieved for the first time in the world RFID Reader/Writer in Conformity to EPC C1G2 Standard and Tags Attachable to Metal are Developed", Mitsubishi, *"Changes for the Better"*, Development No. 0516, Sep. 7, 2005, pp. 1-5.

(Continued)

*Primary Examiner*—Michael C Wimer
(74) *Attorney, Agent, or Firm*—Fujitsu Patent Center

(57) ABSTRACT

An antenna for a radio frequency identification tag, includes a dielectric board; and a pair of conductive plates; wherein the pair of the conductive plates has a point symmetrical configuration with respect to a mounting position of a radio frequency identification tag integrated circuit. The pair of the conductive plates and the mounting position of the radio frequency identification tag integrated circuit may be arranged along a standard line on the surface of the dielectric board.

12 Claims, 14 Drawing Sheets

FOREIGN PATENT DOCUMENTS

TW           518802        1/2003
WO     WO 2006/031501 A1    3/2006

OTHER PUBLICATIONS

DataBase EPODOC European Patent Office, The Hague, NL; May 1, 2006, Fujitsu Ltd.: "Antenna and noncontact-type tag" XP002452087 Abstract.

(European Search Report EP 06 020271; dated Oct. 12, 2007).

Taiwanese Office Action mailed Jan. 15, 2009 for corresponding Taiwanese Application No. 95135342 (English Language Translation).

Taiwanese Office Action, and English language translation thereof, mailed Aug. 12, 2009 from TW Patent Office for corresponding TW App. No. 095135342.

* cited by examiner $$f = \frac{1}{2\pi\sqrt{LC}}$$

$$R1 = R2$$

RADIO FREQUENCY IDENTIFICATION TAG AND ANTENNA FOR RADIO FREQUENCY IDENTIFICATION TAG

BACKGROUND OF THE INVENTION

1. Field of the Invention

The present invention generally relates to radio frequency identification tags and antennas for the radio frequency identification tags.

2. Description of the Related Art

Recently, a system using a radio frequency identification tag has become widely noticed. This system includes a radio frequency identification tag and a reader/writer device. The reader/writer device can read out information from the radio frequency identification tag and write information into the radio frequency identification tag. Such a reader/writer device may be called an interrogator. The radio frequency identification tag may be called an RF tag, an RFID, an RFID tag, an IC tag, an electronic tag, or the like.

There are an active type and a passive type in the radio frequency identification tags. The active type RF tag can provide electric power by itself so that a device structure at a side of an RF tag reader can be simplified.

The passive type RF tag cannot provide electric power by itself and therefore an operation such as sending ID information is performed by receiving energy from the outside. The passive type RF tag is preferable from the view point of cost saving of the radio frequency identification tag and will be useful.

From the view point of the frequency band of a signal to be used, there are an electromagnetic coupling and an electromagnetic wave type in the radio frequency identification tags.

The electromagnetic coupling type radio frequency identification tag uses a frequency band of several kHz, a frequency band of approximately 13.5 MHz, or the like. The electromagnetic wave type radio frequency identification tag uses a Ultra-High Frequency (UHF) band such as approximately 950 MHz or a high frequency band such as approximately 2.45 GHz.

From the view point of an increase in communicating distance, it is preferable to use the high frequency.

In the system using the radio frequency identification tag, data such as identification information (ID) or a product number are read out and written in via the radio frequency identification tag, so that product management or the like may be performed. Alternatively, information indicating a value such as a ticket or points may be written in or read out. Thus, the radio frequency identification tag is expected to be widely used for not only mere product management but also as an electronic ticket for a next generation traffic system, electronic money, and others.

There may be several subjects accompanying the radio frequency identification tag. Particularly, whether the subject has conductivity is critical for design of the radio frequency identification tag. If the subject has insulating properties, operating characteristics or the communication environment of the radio frequency identification tag does not have to be changed before and after the radio frequency identification tag is attached to the subject.

However, if the radio frequency identification tag is attached to a conductive material such as a metal housing, an imaginary (complex) electric current due to the conductivity is generated at the time of communication. Therefore, a large influence is given to a receiving signal level and/or transmitting signal level so that the operating characteristics of the radio frequency identification tag are drastically changed.

For example, a metal container or a stretcher formed by a metal pile may correspond to a specific example of a conductive subject. But the conductive subject is not limited to these examples.

Because of this, the communicating distance of the radio frequency identification tag attached to the conductive subject is limited to be shorter than that of the radio frequency identification tag attached to the subject having the insulating properties.

In order to solve the problem discussed above, a passive type radio frequency identification tag wherein a configuration of the antenna is devised so that the tag can be directly attached to metal is suggested in "Development of a tag for metal attachment and a reader/writer of RFID in conformity of EOC ClG2 standard", Mitsubishi Electric Corporation, Sep. 7, 2005, posted at http://www.mitsubishielectric.co.jp/news-data/2005/pdf/0907-b.pdf.

However, an antenna for a radio frequency identification tag disclosed in the above-mentioned publication is relatively thick such as approximately 5 mm. This is not preferable from the view point of manufacturing the radio frequency identification tag at low cost. In addition, in the radio frequency identification tag disclosed in the above-mentioned publication, a thin and long groove (slit) is formed in a metal plate forming the antenna so as to pierce the metal plate and a radio frequency identification tag integrated circuit is to be connected into the slit. It is not easy to speedily manufacture such a complex configuration of the antenna with high precision.

SUMMARY OF THE INVENTION

Accordingly, the present invention may provide a novel and useful radio frequency identification tag and antenna for the radio frequency identification tag solving one or more of the problems discussed above.

More specifically, the embodiments of the present invention may provide a thin radio frequency identification tag whereby a communicating distance can be long, and an antenna for the radio frequency identification tag.

One aspect of the present invention may be to provide an antenna for a radio frequency identification tag, including: a dielectric board; and a pair of conductive plates; wherein the pair of the conductive plates has a point symmetrical configuration with respect to a mounting position of a radio frequency identification tag integrated circuit.

It may be also an aspect of the present invention to provide a radio frequency identification tag, including: an antenna including: a dielectric board, and a pair of conductive plates, wherein the pair of the conductive plates has a point symmetrical configuration with respect to a mounting position of a radio frequency identification tag integrated circuit, and the radio frequency identification tag integrated circuit is provided at the mounting position and connected to the pair of the conductive plates.

According to an embodiment of the present invention, it is possible to make the communicating distance of the radio frequency identification tag to be long and the thickness of the radio frequency identification tag to be small.

Other objects, features, and advantages of the present invention will be come more apparent from the following detailed description when read in conjunction with the accompanying drawings.

DETAILED DESCRIPTION OF THE PREFERED EMBODIMENTS

Figure 1:
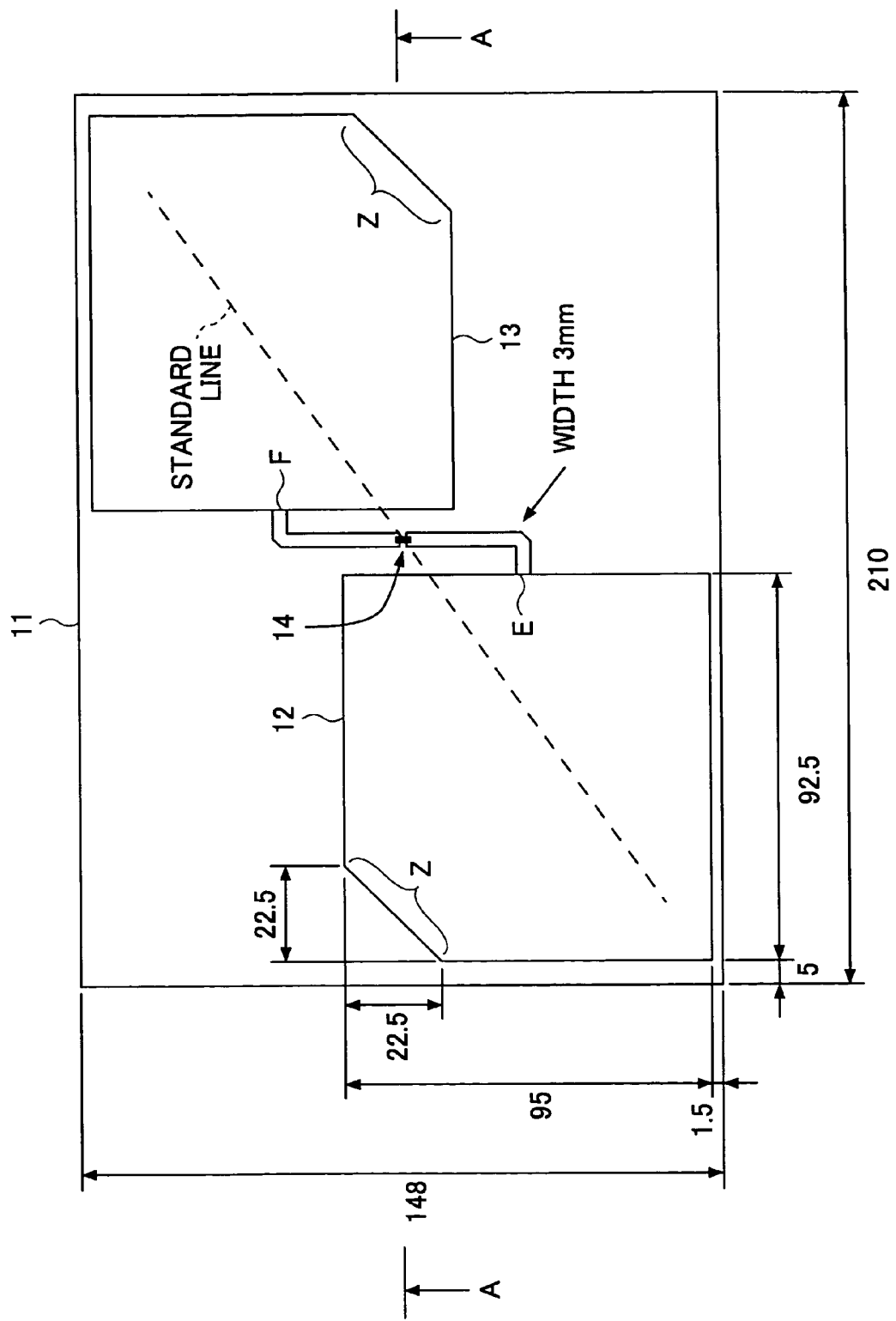
FIG. 1 is a plan view of a radio frequency identification tag of a first embodiment of the present invention.

A description is given below, with reference to the FIG. 1 through FIG. 14 of embodiments of the present invention.

In embodiment of the present invention discussed below, an antenna for a radio frequency identification tag, including a dielectric board; and a pair of conductive plates; wherein the pair of the conductive plates has a point symmetrical configuration with respect to a mounting position of a radio frequency identification tag integrated circuit is provided.

In embodiment of the present invention discussed below, a radio frequency identification tag, including: an antenna including: a dielectric board, and a pair of conductive plates, wherein the pair of the conductive plates has a point symmetrical configuration with respect to a mounting position of a radio frequency identification tag integrated circuit; and the radio frequency identification tag integrated circuit is provided at the mounting position and connected to the pair of the conductive plates.

Since the above-mentioned antenna structure is easily matched to the radio frequency identification tag integrated circuit, it is not necessary to prepare an adjusting circuit for matching.

From the view point of forming a radio frequency identification tag accompanying with the conductive subject, a ground conductive plate may be provided on a rear surface of the dielectric board.

In the above-mentioned antenna for the radio frequency identification tag, the pair of the conductive plates and the mounting position of the radio frequency identification tag integrated circuit may be arranged along a standard line on the surface of the dielectric board. Each of outlines of the pair of the conductive plates may have a line part parallel with the standard line. Each of outlines of the pair of the conductive plates may have a line part perpendicular to the standard line. Each of outlines of the pair of the conductive plates may form substantially triangle configuration. A ground conductive plate may be provided on a rear surface of the dielectric board. The pair of the conductive plates may receive and transmit a circular polarized wave signal. Each of outlines of the pair of the conductive plates may have one or more vertices forming obtuse angles. Each of outlines of the pair of the conductive plates may form a polygonal configuration having four or more vertices.

By forming a linear part in a part of an outline of each of the conductive plates, it is possible to effectively receive and transmit a circular polarized wave. As a result of this, it is possible to further extend the communicating distance.

In the above-mentioned antenna for the radio frequency identification tag, a pair of inductance elements may be provided in a parallel manner in a line between a feeding terminal of one of the conductive plates and a feeding terminal of the other conductive plate.

This structure is preferable from the view point of forming a radio frequency identification tag of a broad band accompanying the non-conductive subject.

In the above-mentioned antenna for the radio frequency identification tag, each of the pair of the lines forming the pair of the inductance elements may have a point symmetrical configuration with respect to the mounting position.

This structure is preferable from the view point of effectively sending and receiving a circularly polarized wave signal even if the radio frequency identification tag accompanies the non-conductive subject.

In the above-mentioned antenna for the radio frequency identification tag, signal of a Ultra-High Frequency (UHF) band may be received and transmitted via the pair of the conductive plates.

First Embodiment of the Present Invention

Figure 2:
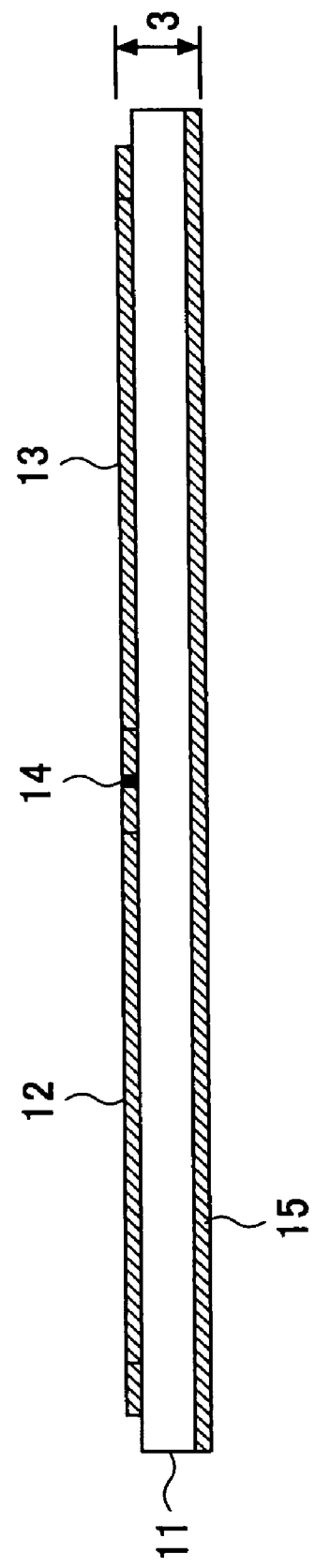
FIG. 2 is a cross-sectional view taken along a line A-A of the radio frequency identification tag shown in FIG. 1.

FIG. 1 is a plan view of a radio frequency identification tag of a first embodiment of the present invention. FIG. 2 is a cross-sectional view taken along a line A-A of the radio frequency identification tag shown in FIG. 1.

Referring to FIG. 1 and FIG. 2, a radio frequency identification tag of a first embodiment of the present invention includes a dielectric board 11, a pair of conductive plates 12 and 13 provided on a surface of the dielectric board 11, a radio frequency identification tag integrated circuit (that may be called a tag LSI or tag IC) 14, and a ground conductive plate 15 provided on a rear surface of the dielectric board 11.

The radio frequency identification tag receives and transmits a signal of a Ultra-High Frequency (UHF) band via the pair of the conductive plates 12 and 13. A unit of measurement in FIG. 1 is "mm". However, numerical values are just examples and various numerical values may be used in the scope of the present invention.

The dielectric board 11 has, for example, a thickness of approximately 3 mm and a dielectric constant of approximately 3.3. The dielectric board 11 may have other thicknesses and dielectric constants.

Each of the conductive plates 12 and 13 has the same configuration. The conductive plates 12 and 13 are formed by metal plate-shape members and called metal patch. The conductive plates 12 and 13 function as radiating elements for sending and transmitting electromagnetic waves. Each of the conductive plates 12 and 13 has an outline of substantially square shape. One corner among four corners of the substantially square shape is obliquely cut. The outline configuration of the conductive plate is further discussed in a second embodiment of the present invention. The conductive plates 12 and 13 and the ground conductive plate 15 have thickness of approximately 30 through 35 μm.

The tag LSI 14 is provided (in the center) between a feeding point E of the conductive plate 12 and a feeding point F of the conductive plate 13. The pair of the conductive plates 12 and 13 has a point-symmetrical configuration with respect to a mounting position of the tag LSI 14. In the following description, the tag LSI and the mounting position of the tag LSI are denoted by 14.

In other words, the pair of the conductive plates 12 and 13 and the tag LSI 14 are arranged along a standard line on the dielectric board 11. On this point, a feeding way of this example is quite different from that of a conventional patch antenna.

In the conventional patch antenna, only a single metal patch is prepared and a pair of two metal patches is not prepared. In the conventional art, feeding is performed between this single metal patch and the ground conductive plate provided on the rear surface of the dielectric board. This feeding way is called microstrip feeding.

On the other hand, in the example shown in FIG. 1 and FIG. 2, two metal patches are provided on a surface of the dielectric board 11. The tag LSI 14 is provided between the feeding points of two metal patches so that a balanced feeding way is realized.

For proper operation of the radio frequency identification tag, impedance of the tag LSI 14 and the impedance of the radio frequency identification tag antenna parts 11, 12, 13, and 15 should be properly matched.

Figure 3:
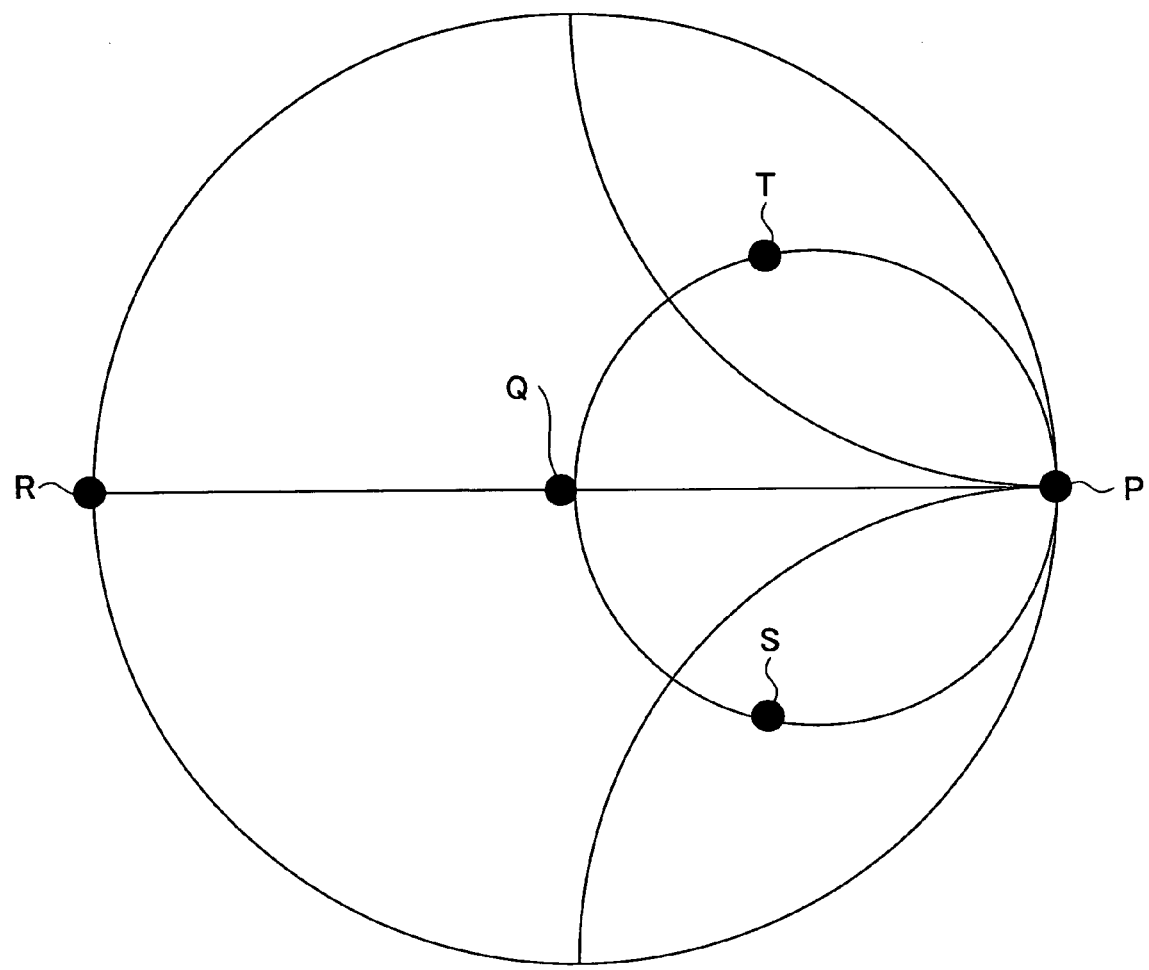
FIG. 3 is a Smith chart for explaining an impedance characteristic of a circuit or an antenna.

FIG. 3 is a Smith chart for explaining an impedance characteristic of a circuit or an antenna. In FIG. 3, circles whose diameters are all or a part of a line P-R and passing through a point P represent impedance characteristics, namely traces of impedances having the same resistance elements (real number elements). In addition, circular arcs passing through the point P and crossing vertically with all of the circles represent traces of impedances whose reactance elements (imaginary number elements) are the same.

Generally, it is possible to adjust to, for example, a characteristic impedance such as 50Ω of impedance of a dipole antenna wherein the imaginary number element is substantially zero and the value of the resistance element is 50Ω. The characteristic impedance of 50Ω corresponds to an original point Q of the Smith chart.

On the other hand, the impedance of the tag LSI has a resistance element and a capacity element that are represented by a point S in the Smith chart.

Therefore, in general, the impedance of the antenna and the impedance of the tag LSI are not matched as they are. Because of this, in order to make both impedances match, an adjusting circuit is provided. For realizing the adjusting circuit, configurations, patterns, and measurements of the antenna and a line are designed.

Figure 4:
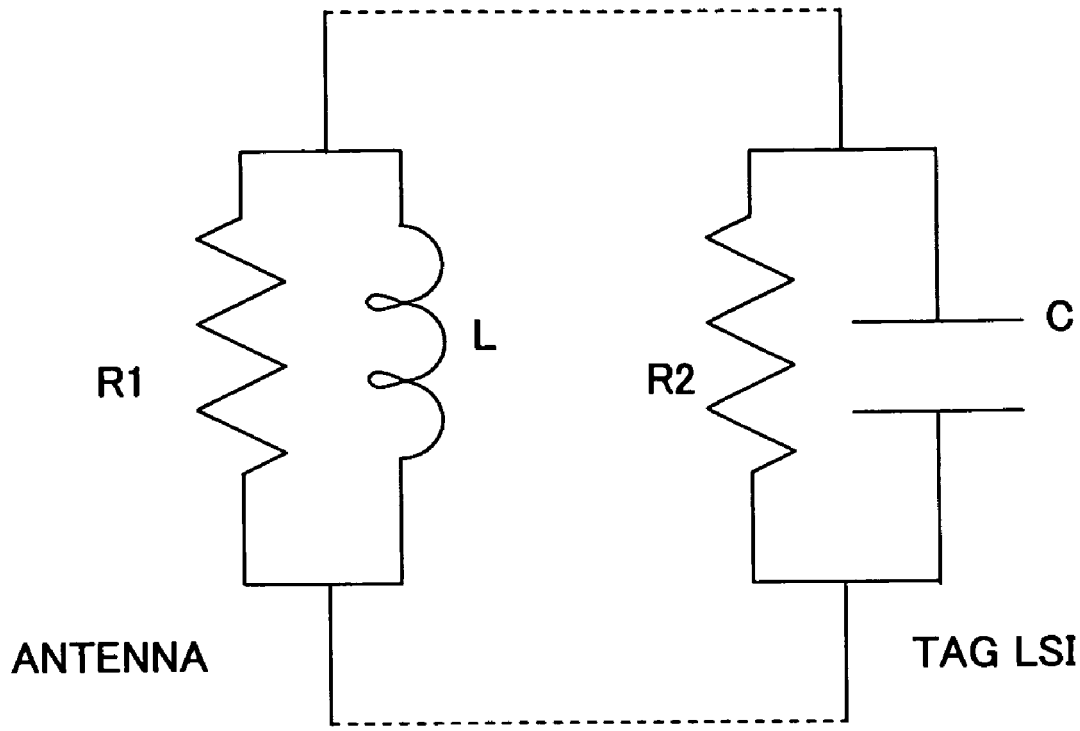
FIG. 4 is a view for explaining a matching condition of an antenna and a tag LSI.

FIG. 4 is a view for explaining a matching condition of the antenna and the tag LSI. More specifically, FIG. 4 shows conditions for matching the antenna and the tag LSI at a certain operational frequency "f".

The antenna is expressed as a parallel circuit having a resistance element R1 and an impedance element L. The tag LSI is expressed as a parallel circuit having a resistance element R2 and a capacitance element C. The following conditions are required for the matching of the antenna and the tag LSI.

$$f = (2\pi\sqrt{0(LC)})^{-1}; \text{ and}$$

$$R1 = R2$$

In FIG. 3, the impedance of the tag LSI 14 is indicated as it is situated at a point S at its operational frequency such as, for example, 950 MHz. A point T has the same resistance element as that of the impedance indicated by the point S and represents impedance having a reactance element having a different mark. If the impedance at the point S is "R−jX", the impedance at the point T is represented by "R+jX". If the impedance of a circuit connected to the LSI is in the vicinity of the point T at 950 MHz, the tag LSI and the antenna can be properly matched.

In a case where the conventional dipole antenna, the patch antenna, or the like is used, impedance conditions are satisfied by properly adjusting a pattern of the line or the slit. However, in this embodiment, since the structures shown in FIG. 1 and FIG. 2 are applied as the antenna structure, it is possible to adjust the impedance of the circuit connected to the tag LSI 14, namely the impedance from the feeding points E and F to the vicinity of the point T from the first time at a desirable frequency such as 950 MHz. As a result of this, in this embodiment unlike the conventional art, an additional impedance adjusting circuit is not required.

Figure 5:
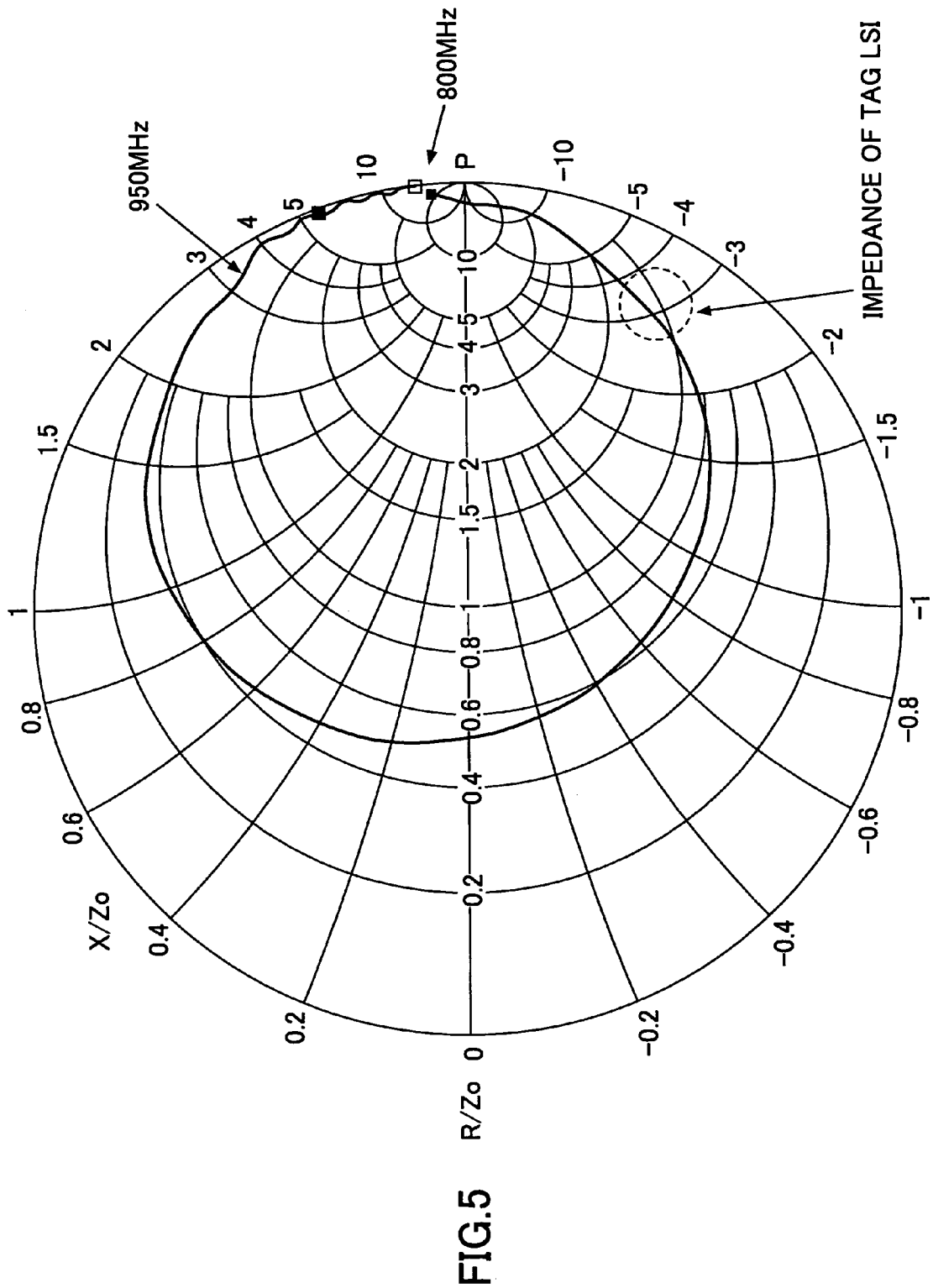
FIG. 5 is a view showing a result of simulation of an impedance characteristic.

FIG. 5 is a view showing a result of simulation of an impedance characteristic. More specifically, FIG. 5 shows a result of simulation where the impedance characteristics of the antenna parts 11, 12, 13, and 15 for the radio frequency identification tag shown in FIG. 1 and FIG. 2 are plotted in a frequency range of 0.8 GHz through 1.1 GHz.

For simplification of calculation, it is assumed that the ground conductive plate is an endlessly wide metal plate. In the Smith chart shown in FIG. 4, the resistance value R and the reactance value X are standardized by characteristic impedance $Z_0$.

As shown in FIG. 5, as the frequency is increased from 0.8 GHz (800 MHz), the impedance draws a counterclockwise circular shape trace from the vicinity of the point P. It is found that desirable impedance (complex conjugate of the impedance of the tag LSI) is obtained at 950 MHz.

Second Embodiment of the Present Invention

In the meantime, the reader/writer device transmits a circularly polarized wave signal to the radio frequency identification tag so that electric power and an opportunity of response are given to the radio frequency identification tag.

The conventional radio frequency identification tag has, for simplification of the structure, an antenna for receiving and transmitting a linearly polarized wave signal.

If the reader/writer device also transmits the linearly polarized wave signal to the radio frequency identification tag, the amount of an electric power supplied to the radio frequency identification tag drastically depends on a positional relationship of the reader/writer device and the radio frequency identification tag. If a polarization plane of the reader/writer device and a polarization plane of the radio frequency identification tag cross each other, the radio frequency identification tag may not respond with a proper response signal to the reader/writer device.

In order to prevent problems discussed above, the reader/writer device transmits the circularly polarized wave signal to the radio frequency identification tag. Because of this, regardless of the positional relationship of the reader/writer device and the radio frequency identification tag, the radio frequency identification tag always receives a response command signal from the reader/writer device so as to correspond to the signal.

However, the antenna for the radio frequency identification tag operates only for receiving and transmitting the linearly polarized wave signal. Therefore, while the radio frequency identification tag can receive and transmit the signal with minimum electric power, it is difficult to receive and transmit the signal with electric power greater than the minimum electric power.

A second embodiment of the present invention can solve the problem discussed above and can increase the electric power that can be supplied to the tag LSI and a communicating distance.

A pair of the conductive plate in the second embodiment of the present invention is formed so as to receive and transmit the circularly polarized wave signal. As shown in FIG. 1, each of the outlines of the pair of the conductive plates 12 and 13 has a linear part Z along the standard line.

The outline of the conductive plate may have plural vertices forming obtuse angles (positioned at both ends of the linear part Z in the example shown in FIG. 1) or form a polygonal configuration having four or more vertices.

Figure 6:
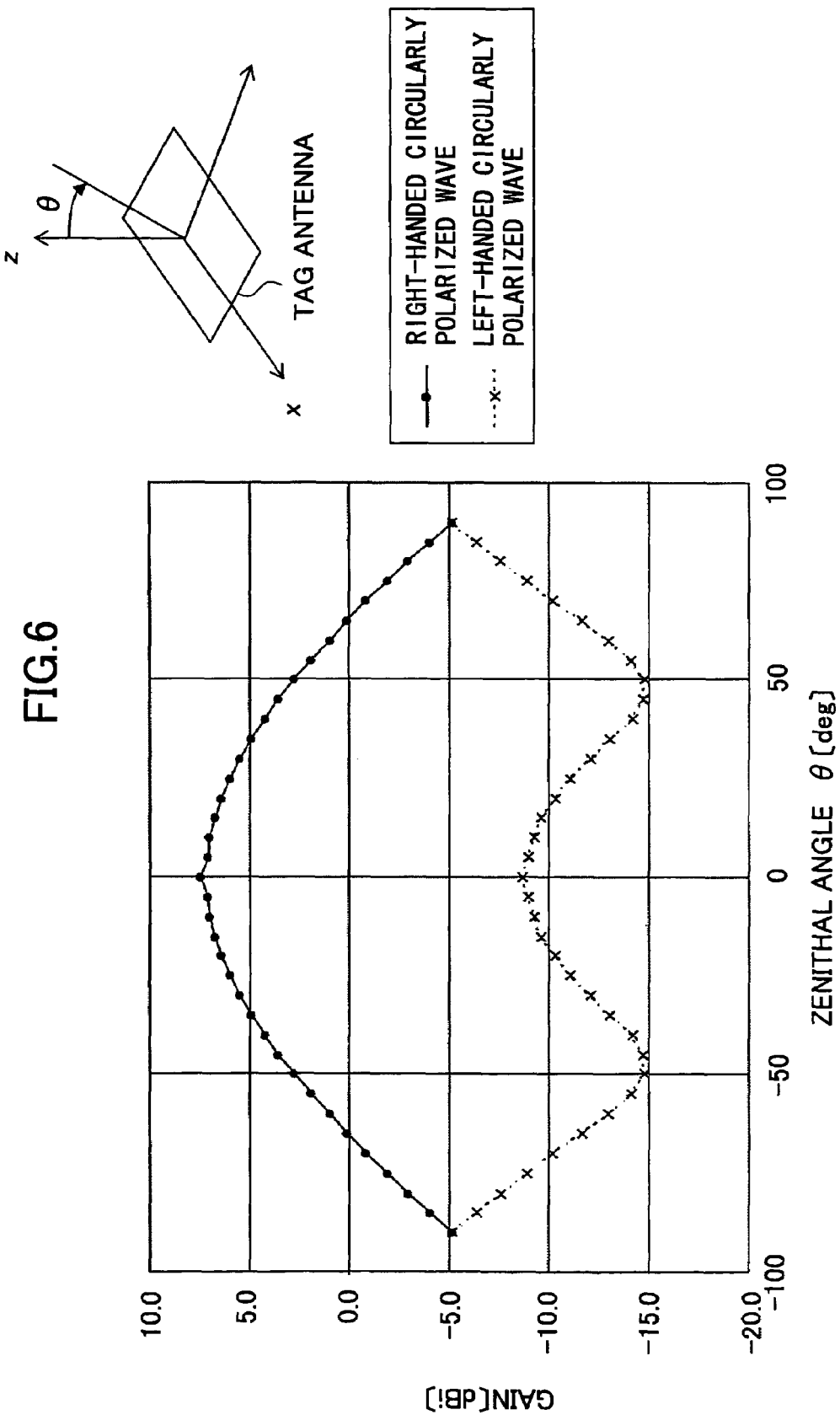
FIG. 6 is a view showing gains of a right-handed circularly polarized wave and a left-handed circularly polarized wave.

FIG. 6 is a view showing gains of a right-handed circularly polarized wave and a left-handed circularly polarized wave. More specifically, FIG. 6 shows gains when the right-handed circularly polarized wave and the left-handed circularly polarized wave of 935 MHz are sent and transmitted from and to the antenna for the radio frequency identification tag shown in FIG. 1 and FIG. 2. The z-axis is defined in a direction perpendicular to the antenna for the radio frequency identification tag. An angle θ formed by the z-axis and a radius direction of a polar coordinate is defined as a zenithal angle. In the graph shown in FIG. 6, the horizontal axis represents the zenithal angle θ (deg) and the vertical axis represents a gain (dBi) in a y-z plane.

In the case of the right-handed circularly polarized wave, as the zenithal angle θ (deg) is changed from −90 degrees to 0 degree, the gain monotonously increases. When the zenithal angle θ is 0 degrees, a maximum gain that is approximately 7 dBi is obtained. As the zenithal angle θ (deg) is changed from 0 degrees to +90 degrees, the gain symmetrically decreases.

In the case of the left-handed circularly polarized wave, as the zenithal angle θ (deg) is changed from −90 degrees to −50 degrees, the gain monotonously decreases. When the zenithal angle θ is −50 degrees, a minimum gain that is approximately −15 dBi is obtained. As the zenithal angle θ (deg) is changed from −50 degrees to 0 degrees, the gain monotonously increases. When the zenithal angle θ is 0 degrees, a gain that is approximately −8 dBi is obtained. As the zenithal angle θ (deg) is changed from 0 degrees to +90 degrees, the gain symmetrically decreases and increases.

Thus, different gains of the right-handed circularly polarized wave and the left-handed circularly polarized wave are obtained. Therefore, this antenna can properly receive and transmit circularly polarized wave signals. If the antenna is used for a linearly polarized wave signal, the same characteristics are indicated for the right-handed circularly polarized wave signal and the left-handed circularly polarized wave signal.

By using the antenna mentioned above, it is possible to obtain the gains of approximately 7 dBi so that extremely long distance communication can be performed.

The antenna for the radio frequency identification tag, disclosed in the above-mentioned "Development of a tag for metal attachment and a reader/writer of RFID in conformity of EOC ClG2 standard", having thickness of approximately 5 mm, obtains 6 dBi. On the other hand, in this embodiment, the antenna for the radio frequency identification tag, having thickness of approximately 3 mm, obtains 7 dBi. In this embodiment, if the thickness of the dielectric board is further increased, it is possible to implement even longer distance communication.

Figure 7:
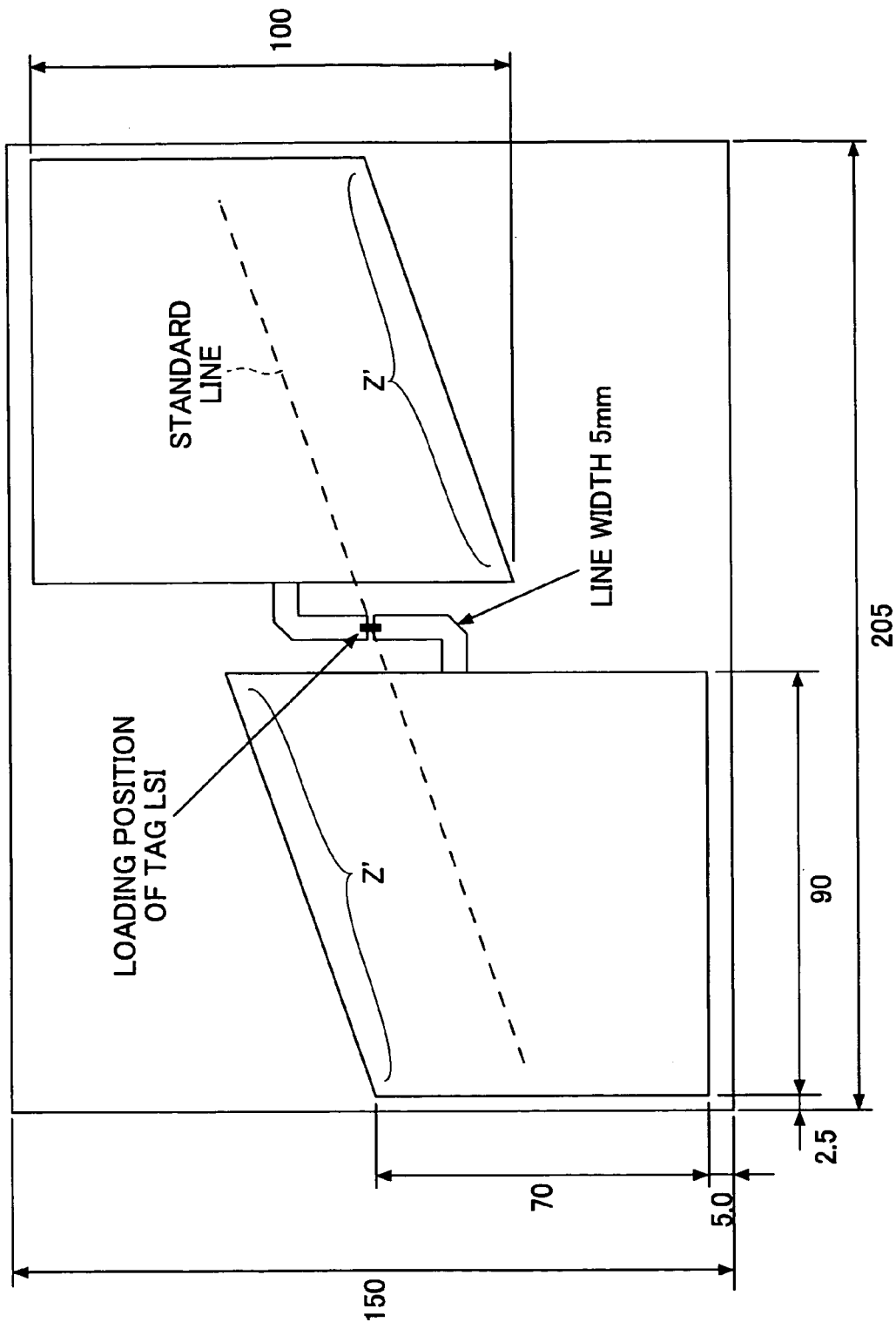
FIG. 7 is a plan view showing a radio frequency identification tag of a second embodiment of the present invention.

FIG. 7 is a plan view showing a radio frequency identification tag of the second embodiment of the present invention. While the operating principle of the antenna for the radio frequency identification tag of the second embodiment of the present invention is the same as that of the first embodiment of the present invention, a linear part Z' along the standard line in the second embodiment is longer than the linear part Z in the first embodiment. In other words, an outline of each of a pair of conductive plates has a single vertex having an obtuse angle. (There are a single vertex having an acute angle and two vertices having right angles in this outline.)

Figure 8:
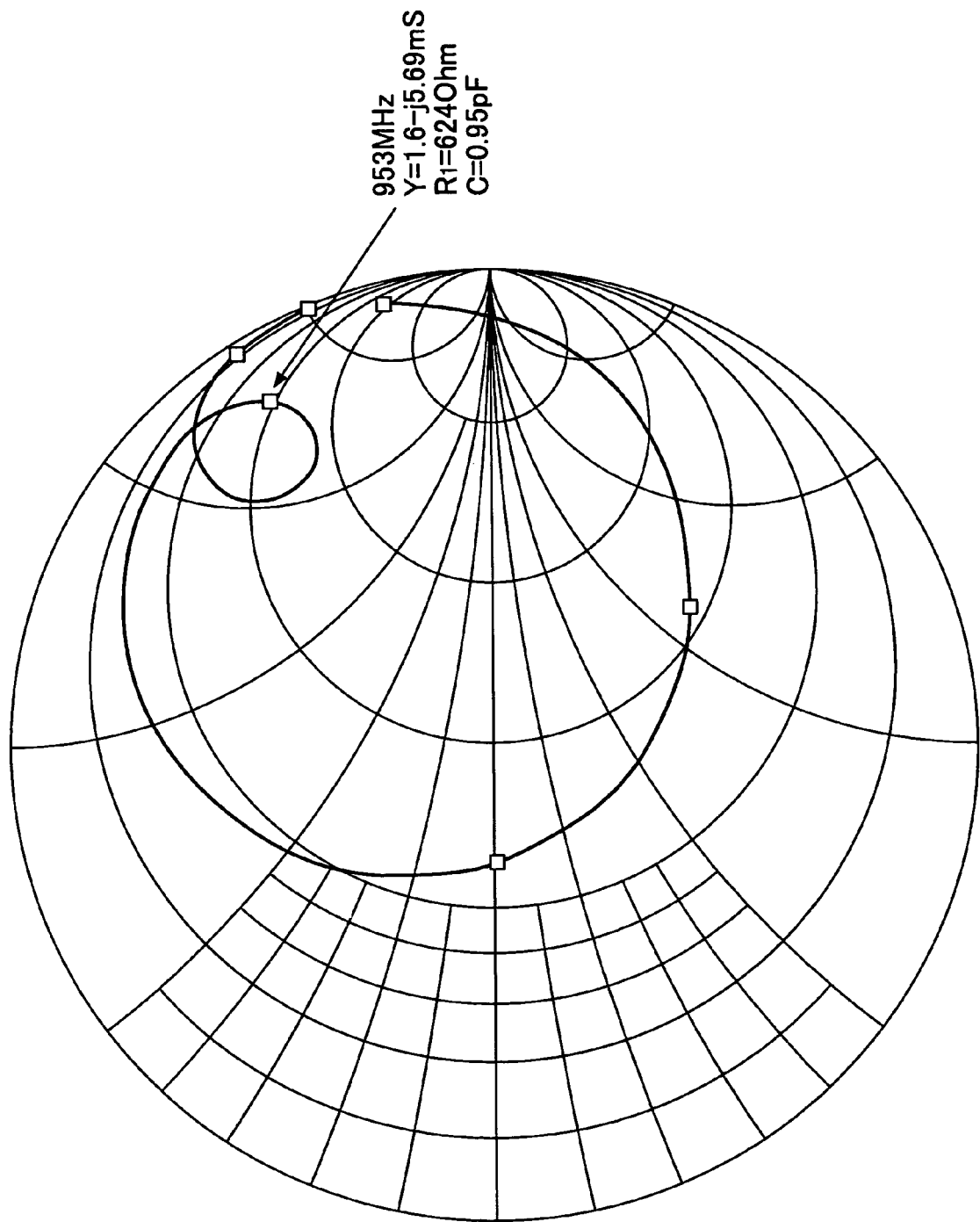
FIG. 8 is a view showing a result of simulation of an impedance characteristic of the second embodiment of the present invention.

FIG. 8 is a view showing a result of simulation of an impedance characteristic of the second embodiment of the present invention.

More specifically, FIG. 8 shows a result of simulation where the impedance characteristics of the antenna for the radio frequency identification tag shown in FIG. 7 are plotted in a frequency range of 0.8 GHz through 1.1 GHz.

In this simulation as well as the simulation shown in FIG. 5, for simplification of calculation, it is assumed that the ground conductive plate is an endlessly wide metal plate. In addition, the resistance value R and the reactance value X are standardized by characteristic impedance $Z_0$.

As shown in FIG. 8, as the frequency is increased from 0.8 GHz (800 MHz), the impedance draws a clockwise circular shape trace from the vicinity of the point P. A small loop is made in the vicinity of 950 MHz.

In this case, it is found that desirable impedance (complex conjugate of the impedance of the tag LSI) is obtained at 950 MHz. More specifically, at 953 MHz, admittance Y is 1.6-j5.69 mS, resistance element $R_1$(Rap) of the impedance is 624Ω, and capacity value C (Ccp) at corresponding tag LSI side is 0.95 pF.

Third Embodiment of the Present Invention

In the above-discussed first and second embodiments of the present invention, the antenna having the pair of the conductive plates provided on the board in a symmetrical manner with respect to the tag LSI is used for the radio frequency identification tag accompanying a metal subject.

However, such an antenna may be used for a radio frequency identification tag accompanying a non-metal subject. In the third embodiment of the present invention, the antenna used for the radio frequency identification tag accompanying the non-metal subject is discussed.

Figure 9:
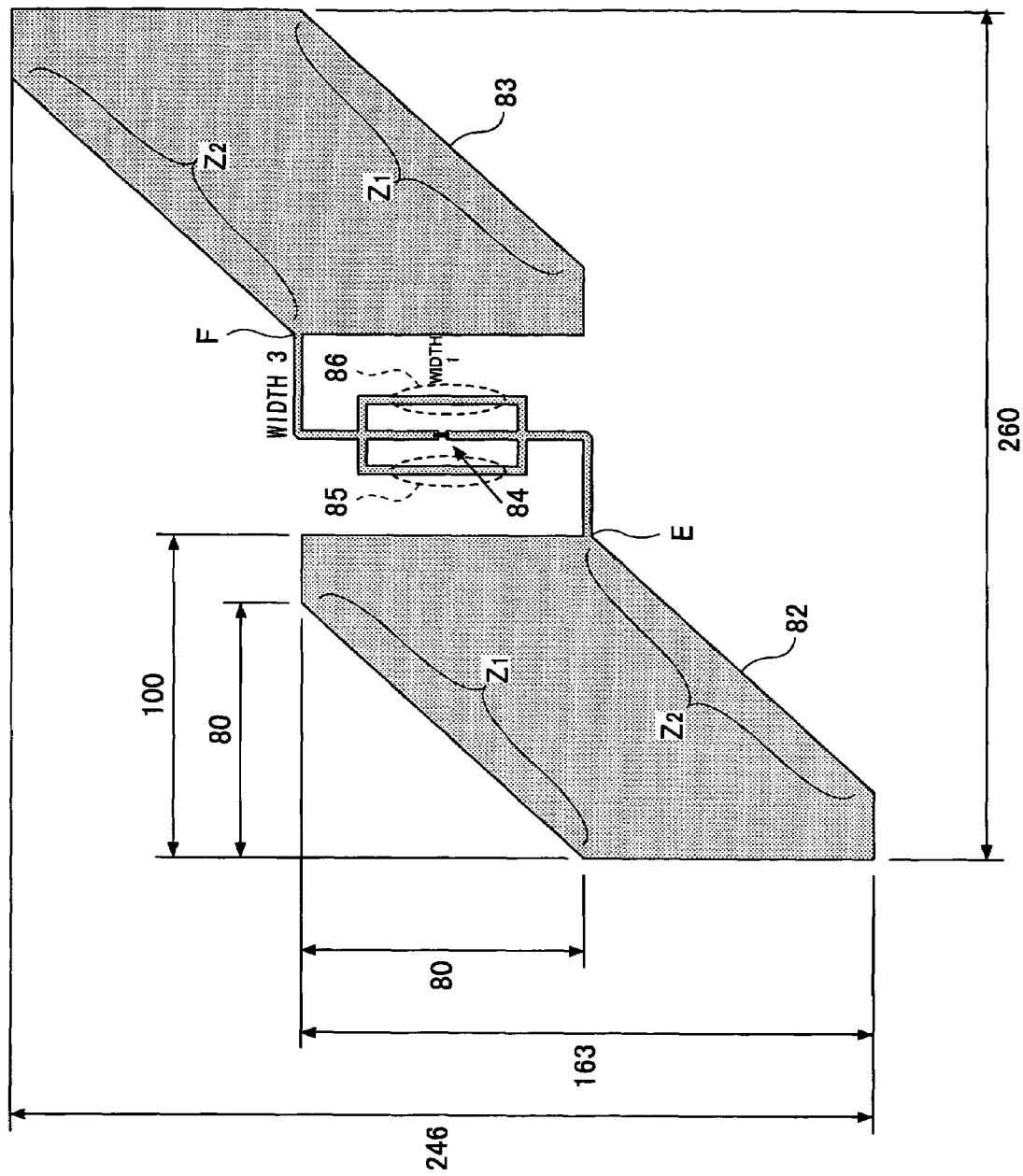
FIG. 9 is a plan view showing a radio frequency identification tag of a third embodiment of the present invention.

FIG. 9 is a plan view showing a radio frequency identification tag of the third embodiment of the present invention.

Referring to FIG. 9, the radio frequency identification tag of the third embodiment of the present invention includes a dielectric board (not shown), a pair of conductive plates 82 and 83 provided on a surface of the dielectric board, and a tag LSI 84. In this embodiment, the ground conductive plate is not provided on the rear surface of the dielectric board.

Each of the pair of the conductive plates 82 and 83 has a point symmetrical configuration with respect to a mounting position 84 of the tag LSI 84. An outline of each of the pair of the conductive plates 82 and 83 has linear parts $Z_1$ and $Z_2$ parallel with a standard line (not shown in FIG. 9).

The outline of the conductive plate may have plural vertices forming obtuse angles (posited at both ends of the linear part $Z_1$ and one end of the linear part $Z_2$ in the example shown in FIG. 9) or form a polygonal configuration having four or more vertices.

In addition, a pair of inductance elements 85 and 86 is provided in a parallel manner in a line between a feeding terminal E of the conductive plate 82 and a feeding terminal F of the conductive plate 83. Each of the pair of the lines forming the pair of the inductance elements has a point symmetrical configuration with respect to the mounting position of the tag LSI. Since the conductive plates and the inductance elements are provided in the point symmetrical manner with respect to the mounting position of the tag LSI 84, it is possible for the conductive plates to properly send and transmit the circularly polarized wave signal.

Figure 10:
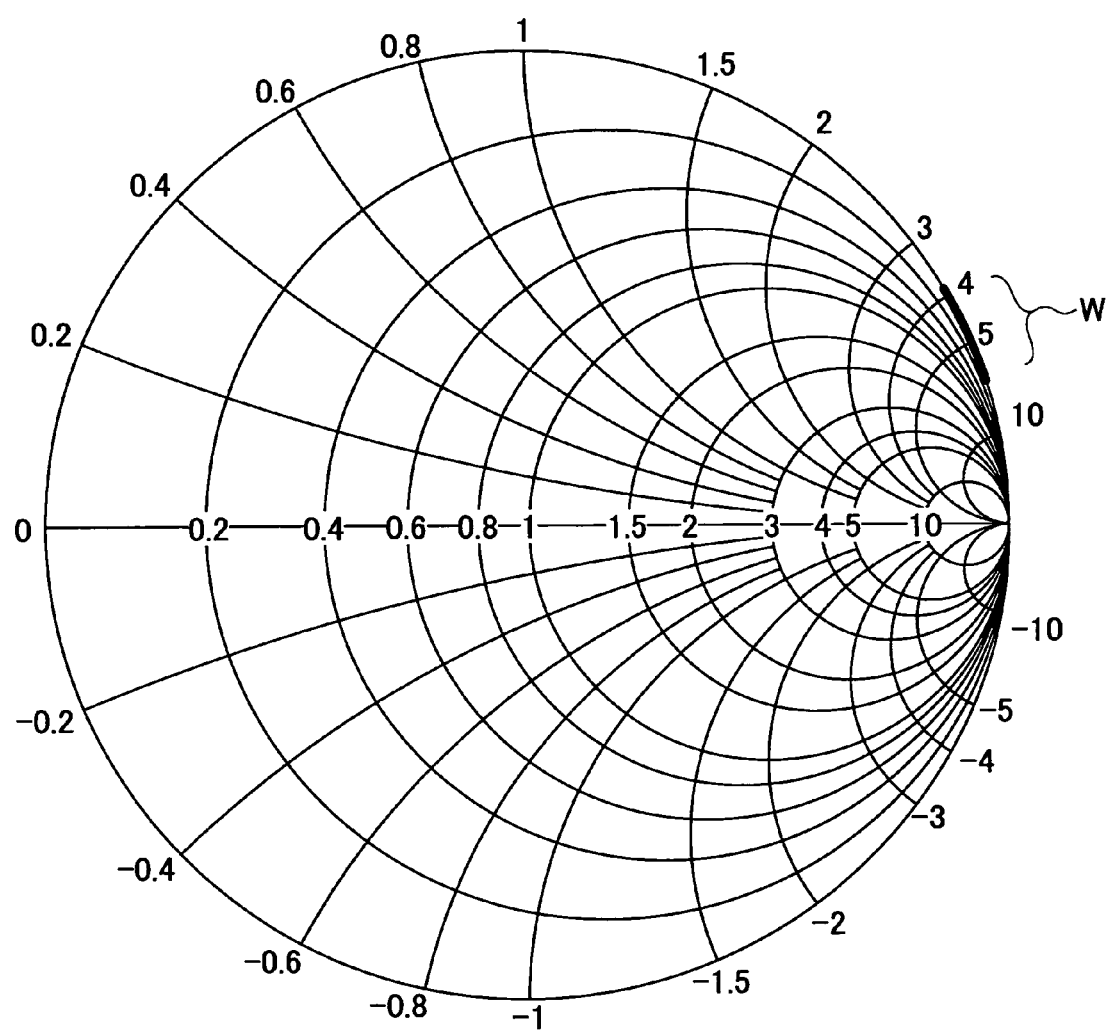
FIG. 10 is a view showing a result of simulation of an impedance characteristic of the third embodiment of the present invention.

FIG. 10 is a view showing a result of simulation of an impedance characteristic of the third embodiment of the present invention.

More specifically, FIG. 10 shows a result of simulation where the impedance characteristics of the antenna for the radio frequency identification tag shown in FIG. 9 are plotted in a frequency range of 0.8 GHz through 1.1 GHz.

In this simulation, for simplification of calculation, it is assumed that there is no dielectric board. In addition, the resistance value R and the reactance value X are standardized by characteristic impedance $Z_0$.

As shown by "W" in FIG. 10, it is found that the impedance is almost not changed even if the frequency is increased from 0.8 GHz (800 MHz) to 1.1 GHz. This is because the pair of the inductance elements 85 and 86 is provided. If such inductance elements are not provided, the impedance is drastically changed depending on frequency. In the third embodiment of the present invention, by properly providing the inductance elements, it is possible to prevent frequency dependency of the impedance of the antenna and match the value of the impedance to the tag LSI. In other words, desirable impedance (complex conjugate of the impedance of the tag LSI) is obtained at 950 MHz. Since the frequency dependency of the impedance is extremely small, such an antenna is useful for a product used in a broad band frequency.

Figure 11:
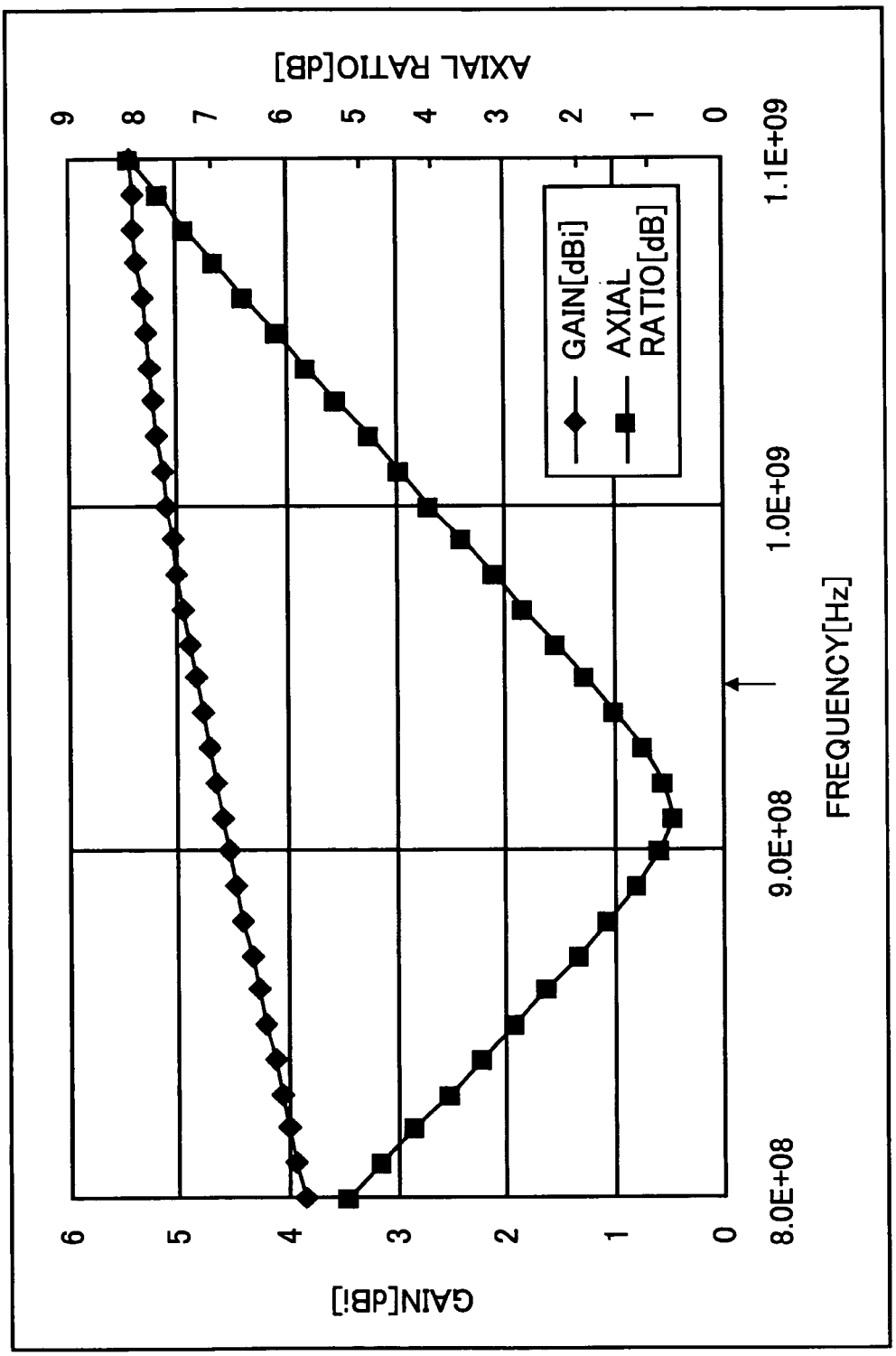
FIG. 11 is a graph showing frequency-dependency of gain and an axial ratio on the antenna shown in FIG. 9.

FIG. 11 is a graph showing frequency-dependency of gain (dBi) and an axial ratio on the antenna shown in FIG. 9.

As discussed above, since the frequency dependency of the impedance is small, the frequency dependency of the gain is also small. Because of this, even if the frequency is changed from 0.8 GHz to 1.1 GHz, the gain is in a range from approximately 3.9 dBi through 5.5 dBi. Especially, a gain of 4.84 dBi is obtained at 950 MHz. While this value is smaller than 7 dBi in the second embodiment of the present invention, communicating distance of the electromagnetic wave is longer than that of the conventional radio frequency identification tag (approximately 2 through 3 dBi).

The axial ratio represents how much the electromagnetic wave sent or transmitted via the antenna realizes a circularly polarized wave. It is possible to realize complete circularly polarized wave if phases of two linear polarized waves forming the circularly polarized wave are shifted at 90 degrees so that equal amplitude is made. However, actually, since there is a gap, an associated wave of two linear polarized waves is an elliptically polarized wave and therefore an amplitude ratio in a longitudinal direction and a branch diagonal direction is expressed as the axial ratio.

According to the above-mentioned simulation result, it is possible to realize a small axial ratio of approximately 1.3 dB at 950 MHz so that a substantially circularly polarized wave is realized. In a case of an ideal circularly polarized wave, the axial ratio is 0 dB.

Fourth Embodiment of the Present Invention

Figure 12:
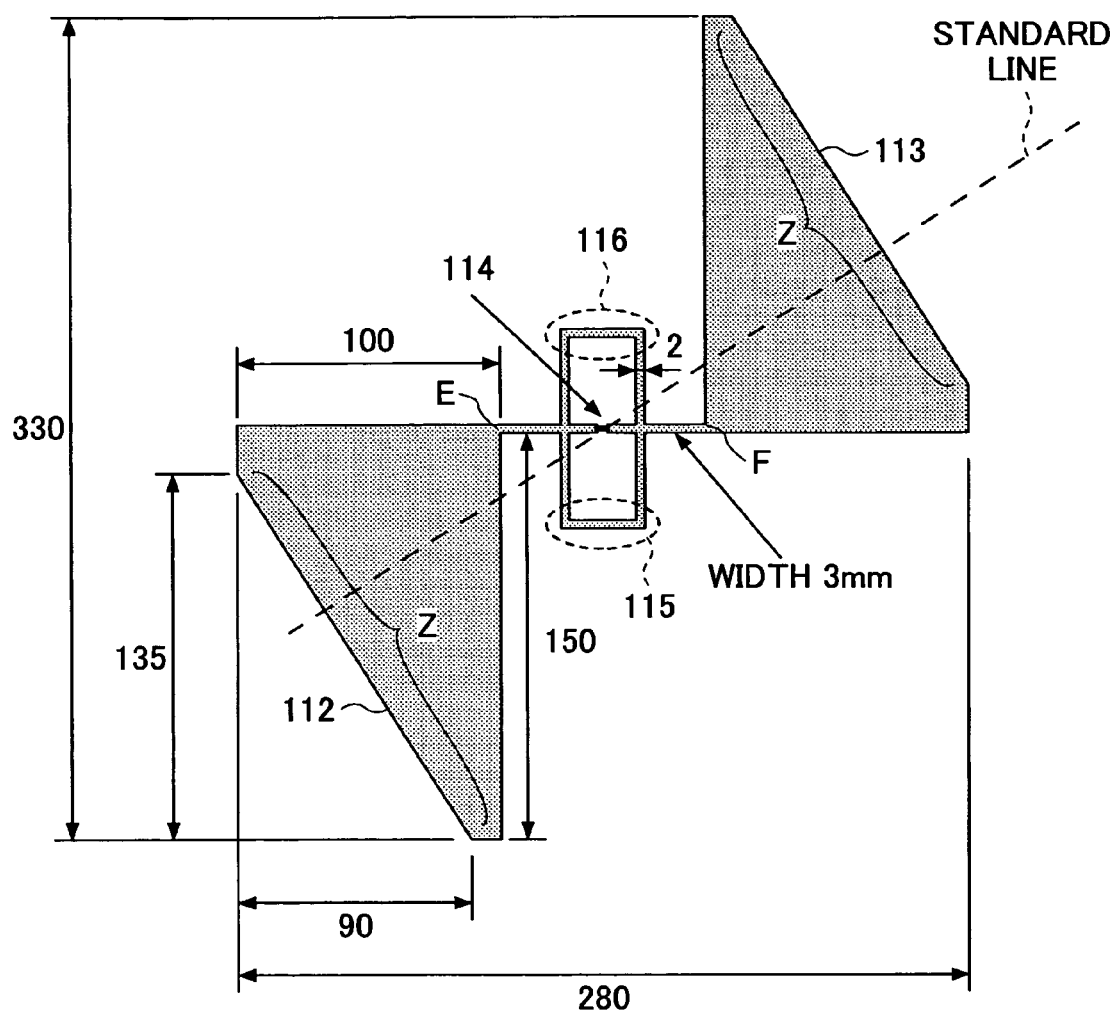
FIG. 12 is a plan view showing a radio frequency identification tag of a fourth embodiment of the present invention.

FIG. 12 is a plan view showing a radio frequency identification tag of a fourth embodiment of the present invention.

Referring to FIG. 12, the radio frequency identification tag of the fourth embodiment of the present invention includes a dielectric board (not shown), a pair of conductive plates 112 and 113 provided on a surface of the dielectric board, and a tag LSI 114. In this embodiment, the ground conductive plate is not provided on the rear surface of the dielectric board.

The operational idea of the antenna in this embodiment is the same as that discussed with reference to FIG. 9. In this embodiment, each of the pair of the conductive plates 112 and 113 has a point symmetrical configuration with respect to a mounting position of the tag LSI 114. An outline of each of the pair of the conductive plates 112 and 113 has linear part Z substantially perpendicular to a standard line. The linear parts of the conductive plates 112 and 113 are parallel to each other.

In addition, a pair of inductance elements 115 and 116 is provided in a parallel manner in a line between a feeding terminal E of the conductive plate 112 and a feeding terminal F of the conductive plate 113. Each of the pair of the lines forming the pair of the inductance elements has a point symmetrical configuration with respect to the mounting position of the tag LSI 114.

Figure 13:
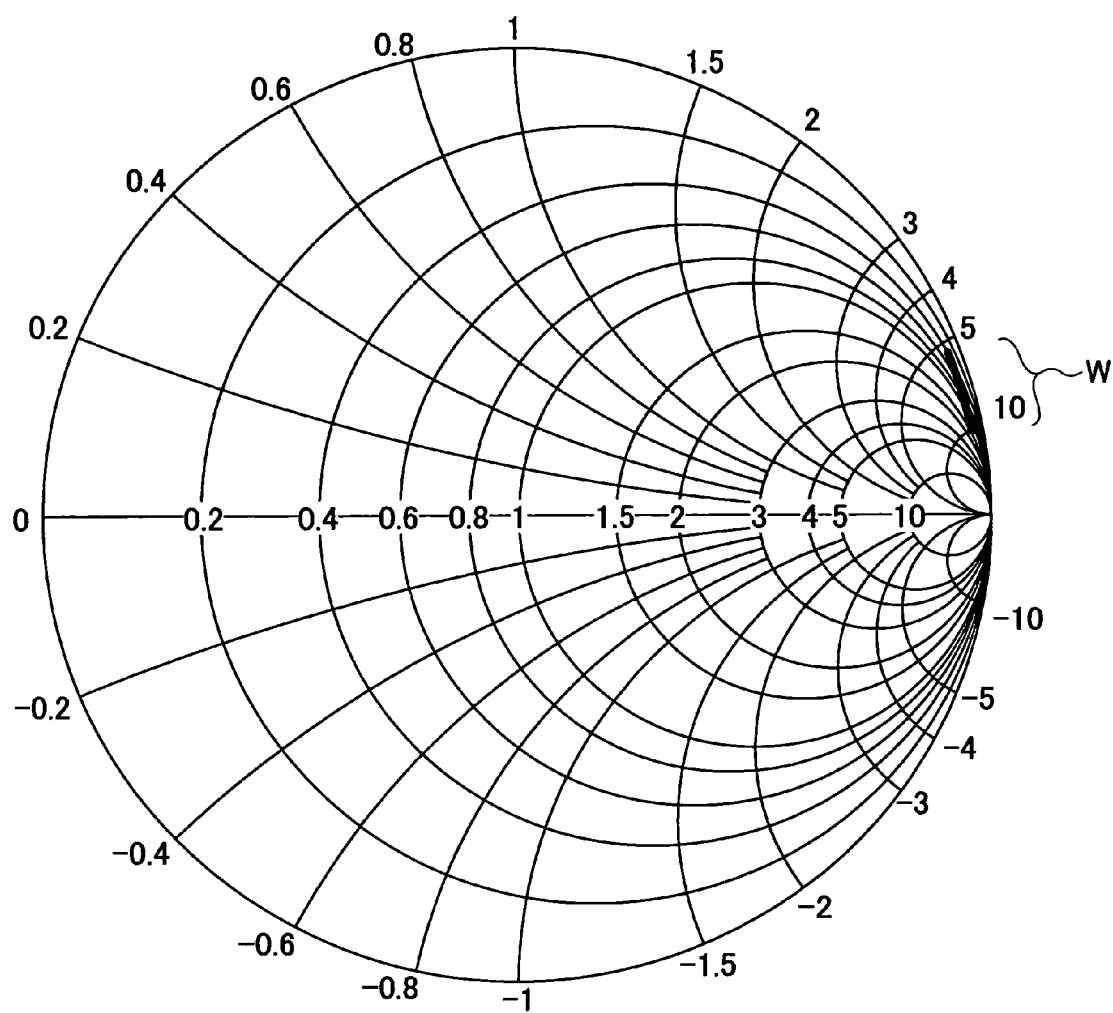
FIG. 13 is a view showing a result of simulation of an impedance characteristic of the fourth embodiment of the present invention.

FIG. 13 is a view showing a result of simulation of an impedance characteristic of the fourth embodiment of the present invention.

More specifically, FIG. 13 shows a result of simulation where the impedance characteristics of the antenna for the radio frequency identification tag shown in FIG. 12 are plotted in a frequency range of 0.8 GHz through 1.1 GHz.

In this embodiment as well as the embodiment shown in FIG. 10, it is found that the impedance is almost not changed even if the frequency is increased to 1.1 GHz. Desirable impedance (complex conjugate of the impedance of the tag LSI) is obtained at 950 MHz and the value of the impedance is matched to the tag LSI. Since the frequency dependency of the impedance is extremely small, such an antenna is useful for a product used in a broad band frequency.

Figure 14:
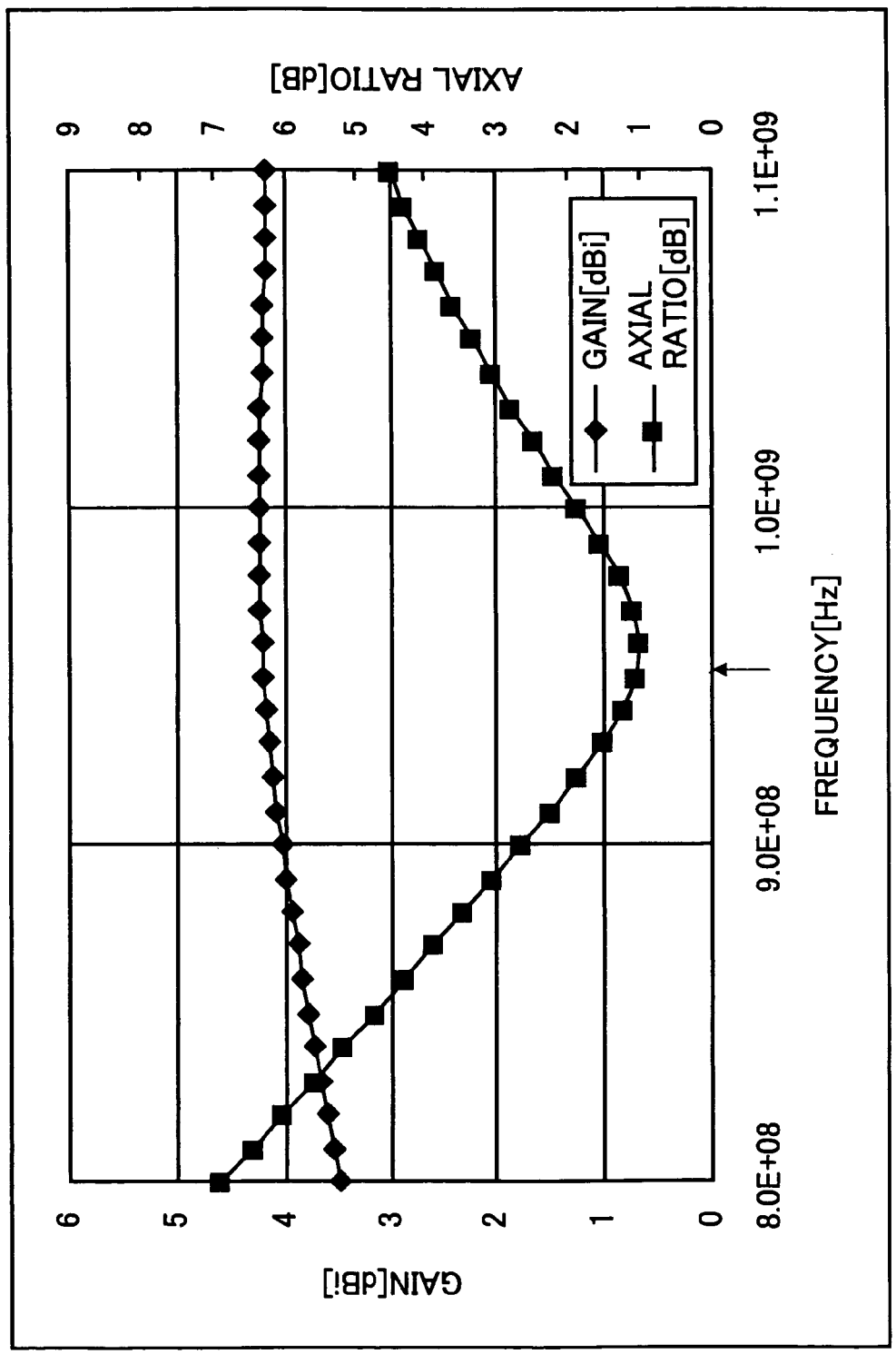
FIG. 14 is a graph showing frequency-dependency of gain and an axial ratio on the antenna shown in FIG. 12.

FIG. 14 is a graph showing frequency-dependency of gain (dBi) and an axial ratio on the antenna shown in FIG. 12.

As discussed above, since the frequency dependency of the impedance is small, the frequency dependency of the gain is also small. Because of this, even if the frequency is changed from 0.8 GHz to 1.1 GHz, the gain is in a range from approximately 3.5 dBi through 4.2 dBi. Especially, gain of 4.2 dBi is obtained at 950 MHz. While this value is smaller than 7 dBi in the second embodiment of the present invention, communicating distance of the electromagnetic wave is longer than that of the conventional radio frequency identification tag (approximately 2 through 3 dBi).

According to the above-mentioned simulation result, it is possible to realize a small axial ratio of approximately 1.0 dB at 950 MHz so that a substantially circularly polarized wave is realized.

Although the present invention is discussed with reference to several separate embodiments for the convenience of explanation, such separating is not the real nature of the present invention. One or more embodiments of the present invention may be used or combined if necessary.

In addition, the present invention is not limited to these embodiments, but variations and modifications may be made without departing from the scope of the present invention.

This patent application is based on Japanese Priority Patent Application No. 2006-144291 filed on May 24, 2006, the entire contents of which are hereby incorporated by reference.

What is claimed is:

1. A radio frequency identification tag, comprising:
   an antenna including:
      a dielectric board; and
      a pair of conductive plates;

wherein the pair of the conductive plates has a point symmetrical configuration with respect to a mounting position of a radio frequency identification tag integrated circuit;

each of the conductive plates has an outline shaped as a parallelogram with at least one corner among the four corners removed, thereby providing an obliquely cut edge;

the pair of the conductive plates and the mounting position of the radio frequency identification tag integrated circuit are arranged along a standard line on the surface of the dielectric board; and the obliquely cut edge is parallel to the standard line.

2. An antenna for a radio frequency identification tag, comprising:

a dielectric board; and a pair of conductive plates, wherein:

the pair of the conductive plates has a point symmetrical configuration with respect to a mounting position of a radio frequency identification tag integrated circuit;

each of the conductive plates has an outline shaped as a parallelogram with at least one corner among the four corners removed, thereby providing an obliquely cut edge;

the pair of the conductive plates and the mounting position of the radio frequency identification tag integrated circuit are arranged along a standard line on the surface of the dielectric board; and the obliquely cut edge is parallel to the standard line.

3. The antenna for the radio frequency identification tag as claimed in claim 2, wherein signal of a Ultra-High Frequency (UHF) band is received and transmitted via the pair of the conductive plates.

the obliquely cut edge is parallel to the standard line.

4. The antenna as claimed in claim 2, wherein each of the conductive plates has an outline shaped as a parallelogram with only one corner among the four corners removed, thereby providing an obliquely cut edge.

5. The antenna as claimed in claim 2, wherein a ground conductive plate is provided on a rear surface of the dielectric board.

6. The antenna as claimed in claim 2, wherein the pair of the conductive plates receives and transmits a circular polarized wave signal.

7. The antenna for the radio frequency identification tag as claimed in claim 6, wherein each of the pair of the conductive plates has at least two edges that form at least one obtuse angle.

8. The antenna for the radio frequency identification tag as claimed in claim 7, wherein each of the conductive plates has four or more vertices.

9. The antenna for the radio frequency identification tag as claimed in claim 6, wherein a pair of inductance elements are provided in a parallel manner in a line between a feeding terminal of one of the conductive plates and a feeding terminal of the other conductive plate.

10. The antenna for the radio frequency identification tag as claimed in claim 9, wherein each of the pair of the lines forming the pair of the inductance elements has a point symmetrical configuration with respect to the mounting position.

11. An antenna for a radio frequency identification tag, comprising:

a dielectric board; and a pair of conductive plates, wherein:

the pair of the conductive plates has a point symmetrical configuration with respect to a mounting position of a radio frequency identification tag integrated circuit;

each of the conductive plates has an outline shaped as a parallelogram with at least one corner among the four corners removed, thereby providing an obliquely cut edge;

the pair of the conductive plates and the mounting position of the radio frequency identification tag integrated circuit are arranged along a standard line on the surface of the dielectric board; and the obliquely cut edge is perpendicular to the standard line.

12. A radio frequency identification tag, comprising:

an antenna including:

a dielectric board; and a pair of conductive plates;

wherein the pair of the conductive plates has a point symmetrical configuration with respect to a mounting position of a radio frequency identification tag integrated circuit;

each of the conductive plates has an outline shaped as a parallelogram with at least one corner among the four corners removed, thereby providing an obliquely cut edge;

the pair of the conductive plates and the mounting position of the radio frequency identification tag integrated circuit are arranged along a standard line on the surface of the dielectric board; and the obliquely cut edge is perpendicular to the standard line.

* * * * *